United States Patent [19]

Sawaoka et al.

[11] Patent Number: 5,589,523
[45] Date of Patent: Dec. 31, 1996

[54] MICROCAPSULE-TYPE CURING AGENT, METHOD FOR PRODUCING THE SAME, THERMOSETTING RESIN COMPOSITION, PREPREG AND FIBER REINFORCED COMPOSITE MATERIAL

[75] Inventors: Ryuji Sawaoka, Ehime; Shinji Kouchi; Toshio Muraki, both of Matsuyama, all of Japan

[73] Assignee: Toray Industries, Inc., Japan

[21] Appl. No.: 468,445

[22] Filed: Jun. 6, 1995

Related U.S. Application Data

[62] Division of Ser. No. 401,195, Mar. 9, 1995.

[30] Foreign Application Priority Data

Mar. 15, 1994 [JP] Japan .................................. 6-043679

[51] Int. Cl.$^6$ .................................................. C08K 9/10
[52] U.S. Cl. .......................... 523/211; 523/205; 523/440; 427/213.3; 427/213.36; 525/423; 525/523; 525/528; 525/936
[58] Field of Search ................................ 523/211, 205, 523/440; 525/403, 523, 528, 936; 427/213.3, 213.36

[56] References Cited

U.S. PATENT DOCUMENTS

| | | | |
|---|---|---|---|
| 4,536,524 | 8/1985 | Hart et al. | 523/211 |
| 4,760,106 | 7/1988 | Gardner et al. | 523/445 |
| 4,808,639 | 2/1989 | Chernack | 525/113 |
| 5,120,665 | 6/1992 | Tsukagoshi et al. | 437/8 |
| 5,135,960 | 8/1992 | Higuchi et al. | 528/32 |
| 5,225,278 | 7/1993 | Kelbania, Jr. et al. | 523/211 |
| 5,302,456 | 4/1994 | Matsui et al. | 428/407 |
| 5,357,008 | 10/1994 | Tsai et al. | 525/504 |
| 5,371,152 | 12/1994 | Hoyano et al. | 525/533 |

FOREIGN PATENT DOCUMENTS

| | | |
|---|---|---|
| 716638 | 8/1965 | Canada . |
| 48-76935 | 10/1973 | Japan . |
| 2-292325 | 12/1990 | Japan . |
| 3-220246 | 9/1991 | Japan . |
| 3-292378 | 12/1991 | Japan . |
| 5-93178 | 4/1993 | Japan . |

*Primary Examiner*—Ralph H. Dean
*Assistant Examiner*—Randy Gulakowski
*Attorney, Agent, or Firm*—Austin R. Miller

[57] ABSTRACT

Disclosed is a microcapsule curing agent including (A) a curing agent for a thermosetting resin and (B) a thermoplastic resin. The microcapsule curing agent is formed as a particle-like material in which component (A) is coated with a layer whose main constituent is component (B) and the mean particle diameter of which is in the range of 0.1 to 20 μm. By using the microcapsule curing agent, a thermosetting resin composition and a prepreg which exhibit good storage stability at room temperature and are excellent in thermal resistance for cured products made therefrom can be obtained. A fiber reinforced composite material obtained using the thermosetting resin composition is excellent in curing uniformity and thermal resistance.

7 Claims, No Drawings

MICROCAPSULE-TYPE CURING AGENT, METHOD FOR PRODUCING THE SAME, THERMOSETTING RESIN COMPOSITION, PREPREG AND FIBER REINFORCED COMPOSITE MATERIAL

This application is a division of Ser. No. 08/401,195 filed Mar. 9, 1995.

BACKGROUND OF THE INVENTION

1. Field of the Invention

The present invention relates to a microcapsule-type curing agent, a method for producing the same, a thermosetting resin composition, a prepreg and a fiber reinforced composite material. More particularly, the present invention relates to a microcapsule-type curing agent which can provide a thermosetting resin composition excellent in storage stability at a room temperature and a method for producing the same, a thermosetting resin composition containing the microcapsule-type curing agent which is excellent in storage stability and can provide a cured product good in thermal resistance, and a prepreg and fiber reinforced composite material comprising the thermosetting resin composition.

2. Description of the Prior Art

Since a thermosetting resin is excellent in various properties such as mechanical properties, electrical properties, chemical resistance, thermal resistance and adhesiveness, it is used not only for composite materials but also for various fields such as painting materials, electric and electronic materials and adhesives. Such a thermosetting resin usually starts to react by mixing a resin with a curing agent or a curing-accelerating agent. Therefore, as a thermosetting resin, a two-package type resin system has been generally used, wherein the non-cured resin and the agent are separately preserved and they are measured and mixed immediately before their use. Recently, however, requirements for a one-package type thermosetting resin system, in which a curing agent is pre-mixed with a resin, have increased due to its good handling ability even for various uses.

Particularly, in a fiber reinforced composite material comprising reinforcing fibers such as carbon fibers, glass fibers or aramide fibers and a matrix resin, a prepreg, which is an intermediate material in which a matrix resin is impregnated into reinforcing fibers, is frequently used, and the material is frequently formed by stacking a plurality of prepregs and curing the stacked prepregs. A thermosetting resin, particularly an epoxy resin is frequently used for the matrix resin. Further, a cyanate ester resin, a maleimide resin and a resin produced by pre-reaction of a cyanate ester resin and a maleimide resin are also used because of their good thermal resistances. As such a matrix resin, mainly a one-package type thermosetting resin system is used, and for example, a resin wherein a latent type curing agent such as dicyandiamide, a hydrazide compound or a boron trifluoride compound is mixed with an epoxy resin is used. However, because such a one-package type thermosetting resin system does not have a sufficient storage stability for a long period, and there is a possibility that the resin and the curing agent react even at room temperature, tack and drape which are important properties of a prepreg decrease. Therefore, a prepreg is used while applying a method for preserving the prepreg in a refrigerator or a method for shortening the period of time for which the prepreg is left at a room temperature before forming. From such present conditions, development of a thermosetting resin composition and a prepreg which are excellent in storage stability at a room temperature is desired.

In order to improve the storage stability of a one-package type thermosetting resin, attempts to prevent reaction of a non-cured resin and a curing agent by forming the curing agent as a microcapsule have been proposed.

JP-B-SHO 54-31468 discloses a method for producing microcapsule-type curing agent whose shell material is formed by an epoxy resin, and describes that the curing agent is useful for a one-package type adhesive. In this method, the capsule is formed by interfacial reaction of a water soluble epoxy resin and an amine compound, but the shell material of the microcapsule is brittle and the shell is easily broken by external pressure to release the curing agent. Therefore, when a resin and the microcapsule-type curing agent are mixed, the capsule is likely to be broken, and as a result, the microcapsule-type curing agent cannot be applied for various uses.

Further, JP-A-HEI 2-292325 and JP-A-HEI 3-220246 disclose microcapsule-type curing agents applicable to epoxy-based adhesives or paints. In these microcapsules, the shell materials are formed from a thermoplastic resin having a specified softening point, and when heated at a temperature higher than the softening point, the capsule is broken and the reaction is initiated. However, because the softening point of the shell material is low and a cured resin contains a thermoplastic resin with a low thermal resistance, there is a problem that the thermal resistance of a cured resin decreases.

Further, the mean particle diameters of these microcapsule-type curing agents are too great to uniformly cure a resin. Furthermore, since the large microcapsule-type curing agent cannot enter into a gap between reinforcing fibers when applied to a matrix resin for a prepreg, a prepreg excellent in quality cannot be obtained because of, for example, occurrence of non-uniform curing condition when the prepreg is cured, and a composite material obtained by curing the prepreg also cannot have a high thermal resistance.

SUMMARY OF THE INVENTION

An object of the present invention is to provide a microcapsule-type curing agent which can provide a thermosetting resin composition and a prepreg excellent in storage stability at a room temperature and excellent in thermal resistance of a cured product made therefrom, and a method for producing such a microcapsule-type curing agent.

Another object of the present invention is to provide a thermosetting resin composition having the above-described advantage and a prepreg which can be uniformly cured and which can provide a fiber reinforced composite material having a high thermal resistance.

A further object of the present invention is to provide a fiber reinforced composite material having a high thermal resistance by using the above-described thermosetting resin composition as its matrix resin.

To accomplish these objects and other objects, a microcapsule-type curing agent according to the present invention comprises (A) a curing agent for a thermosetting resin and (B) a thermoplastic resin dissolvable to the thermosetting resin by heating. The microcapsule-type curing agent is formed as a particle-like material in which the component (A) is coated with a layer whose main constituent is the component (B) and the mean particle diameter of which is in the range of 0.1 to 20 μm.

A method for producing a microcapsule-type curing agent according to the present invention comprises the steps of: dissolving a curing agent for a thermosetting resin insoluble to water and a thermoplastic resin insoluble to water and dissolvable to the thermosetting resin by heating in an organic solvent to form a solution; emulsifying the solution in water; and removing the organic solvent from the emulsified solution.

A thermosetting resin composition according to the present invention comprises a thermosetting resin and a microcapsule-type curing agent. The microcapsule-type curing agent includes (A) a curing agent for the thermosetting resin and (B) a thermoplastic resin dissolvable to the thermosetting resin by heating. The microcapsule-type curing agent is formed as a particle-like material in which the component (A) is coated with a layer whose main constituent is the component (B) and the mean particle diameter of which is in the range of 0.1 to 20 µm.

A prepreg according to the present invention comprises a thermosetting resin, a microcapsule-type curing agent and reinforcing fibers. The microcapsule-type curing agent includes (A) a curing agent for the thermosetting resin and (B) a thermoplastic resin dissolvable to the thermosetting resin by heating. The microcapsule-type curing agent is formed as a particle-like material in which the component (A) is coated with a layer whose main constituent is the component (B) and the mean particle diameter of which is in the range of 0.1 to 20 µm.

A fiber reinforced composite material according to the present invention is formed by curing the prepreg. Alternatively, a fiber reinforced composite material according to the present invention comprises reinforcing fibers and a matrix resin, and the matrix resin is formed by curing the above-described thermosetting resin composition.

DETAILED DESCRIPTION OF THE PREFERRED EMBODIMENTS OF THE INVENTION

The present invention will be explained in more detail by embodiments and examples. However, the present invention is not restricted by the embodiments and examples.

In the microcapsule-type curing agent according to the present invention, a curing agent for a thermosetting resin is coated with a layer whose main constituent is a thermoplastic resin dissolvable to the thermosetting resin by heating. In a composition in which such a microcapsule-type curing agent is dispersed in a thermosetting resin, because the curing agent and the thermosetting resin are maintained in a condition not to be brought into contact with each other, the curing reaction of the thermosetting resin almost does not proceed. However, when such a composition is heated, the thermoplastic resin of the component (B) present at the surface layer of the microcapsule-type curing agent is dissolved into the thermosetting resin and the capsule is broken, the curing agent of the component (A) diffuses in the thermosetting resin and the crosslinking reaction begins. If the thermoplastic resin present at the surface layer of the microcapsule-type curing agent cannot be dissolved into a thermosetting resin by heating, the curing agent of the component (A) cannot diffuse into the thermosetting resin and therefore the crosslinking reaction cannot be performed properly.

In the present invention, the term "curing agent" for a thermosetting resin used as the component (A) is intended to include not only a curing agent such as a compound reacting for curing directly with the thermosetting resin or a compound acting as a catalyst for curing reaction of the thermosetting resin, but also a compound accelerating curing reaction of another curing agent, so-called a curing-accelerating agent. If the curing agent is insoluble to an organic solvent, the operation for forming the microcapsule described later is likely to be difficult. Therefore, the curing agent of the component (A) is preferably soluble to an organic solvent, and more preferably soluble to a hydrophobic organic solvent having a boiling point of not higher than 100° C. Further, if the curing agent is soluble to water, the water absorption of a cured product becomes high, the water resistance thereof is likely to be decreased and the operation for forming the microcapsule described later is likely to be difficult. Therefore, the curing agent of the component (A) is preferably insoluble to water. Where, the hydrophobic organic solvent means a solvent which substantially does not dissolve into water, and for example, a hydrocarbon solvent such as hexane, benzene and toluene, a halogenated hydrocarbon solvent such as methylene chloride and chloroform and a mixture thereof can be employed. Further, a solvent prepared by mixing a hydrophilic alcohol or ketone into these hydrophobic organic solvents at a small content also can be preferably used.

As the component (A), concretely, an aliphatic amine, a cyclic amine, an aromatic amine, a polyamide, an urea compound, an imidazole compound, a guanidine compound, a hydrazide compound, an acid anhydride, a Lewis acid complex, a phenolic compound and a mercaptan compound are preferred. More concretely, as an aliphatic amine, a polymethylenediamine such as octamethylenediamine, as a cyclic amine, isophoronediamine and menthanediamine, as an aromatic amine, diaminodiphenylmethane and diaminodiphenylsulfone, as aurea compound, 3-(3,4-dichlorophenyl)-1,1-dimethyl urea, as a polyamide, a reaction product of dimer acid and triethylenetetramine, as an imidazole compound, 2-undecylimidazole, 2-heptadecylimidazole, 1-benzyl-2-ethylimidazole and 1-benzyl-2-phenylimidazole, as a guanidine compound, tetramethylguanidine and o-tolylbiguanide, as a hydrazide compound, adipic dihydrazide and naphthalene dicarboxylic hydrazide, as an acid anhydride, nadic methyl anhydride, as Lewis acid complex, zinc octoate, as a phenolic compound, bisphenol A, bisphenol F and phenol novolak resin, and as a mercaptan compound, polysulfide resin can be raised, respectively. Among these compounds, an aromatic amine and an imidazole compound are particularly preferred because a cured resin having a high thermal resistance can be obtained.

Further, as the curing agent of the component (A), an additional reaction product of a compound containing glycidyl groups and at least one compound selected from the group consisting of an aliphatic amine, a cycloaliphatic amine, an aromatic amine, a polyamide, an imidazole compound and a guanidine compound also can be preferably used. So, the compound containing a glycidyl group is not particularly restricted, for example, a monoglycidylether such as butylalcohol monoglycidylether or phenol monoglycidylether and a diglycidylether such as bisphenol A diglycidylether or bisphenol F diglycidylether can be employed. An additional reaction product of an imidazole compound and a compound containing glycidyl groups is particularly preferred because a cured resin having a high thermal resistance can be obtained.

A thermoplastic resin dissolvable to a thermosetting resin by heating is used as the component (B). It is possible to control the curing temperature of a thermosetting resin composition by selecting a thermoplastic resin having a different property on dissolution by heating to a thermosetting resin so as to dissolve a shell material of a microcapsule at a desired temperature. Particularly, it is preferred that a thermoplastic resin whose temperature for initiating the dissolution by heating to a thermosetting resin is in the range of 60° to 180° C. is used as the component (B). In a thermoplastic resin having a temperature for initiating the dissolution lower than 60° C., there is a case where the storage stability at a room temperature decreases, and in a thermoplastic resin having a temperature for initiating the dissolution higher than 180° C., there is a case causing improper curing.

As the component (B), a thermoplastic resin having a softening point higher than 200° C. is preferred, wherein the softening point means Vicat softening point. By using such a thermoplastic resin, the thermosetting resin composition dissolved with the component (B) provides a cured product having a high thermal resistance. If the softening point of the thermoplastic resin is not higher than 200° C., the thermoplastic resin having a low thermal resistance is contained in a cured product, and therefore there is a case where the thermal resistance of the obtained cured product decreases.

Further, in a thermoplastic resin insoluble to a hydrophobic organic solvent, there occurs a case where operation for forming a microcapsule becomes difficult as described later. Therefore, the thermoplastic resin of the component (B) is preferably soluble to an organic solvent, more preferably soluble to a hydrophobic organic solvent having a boiling point of not higher than 100° C. If the thermoplastic resin is soluble to water, the water resistance of a cured product is likely to decrease. Therefore, the thermoplastic resin of the component (B) is preferred to be insoluble to water.

As preferable examples of such a thermoplastic resin, a polyamide, a polyphenylene oxide, a polyacetal, a polyarylate, a polyester, a polycarbonate, a polyetherimide, a polyimide, a polysulfone, a polyethersulfone and a polyarylsulfone can be concretely raised. Particularly, a thermoplastic resin, which has a softening point higher than 200° C. by appropriately controlling the molecular structure and the polymerization degree, is preferred. Further, in the present invention, an amorphous thermoplastic resin such as a polyarylate, a polycarbonate, a polyetherimide, a polyimide, a polysulfone, a polyethersulfone and a polyarylsulfone is particularly preferred, from the viewpoint that it is insoluble to water and easily dissolved in a hydrophobic organic solvent and that it is easily dissolved in a thermosetting resin by heating and a thermosetting resin composition having excellent thermal resistance and mechanical properties can be obtained. Furthermore, a mixture of two or more kinds of thermoplastic resins also can be employed.

The microcapsule-type curing agent according to the present invention has a mean particle diameter of 0.1 to 20 μm, preferably 0.5 to 10 μm, wherein the mean particle diameter is determined as follows. After taking a photograph of a microcapsule freely selected using a scanning type electron microscope, the particle diameter thereof is determined from the photograph. This measurement is carried out with respect to 100 capsules, and the mean value thereof is defined as the mean particle diameter of the microcapsule-type curing agent. If the mean particle diameter is less than 0.1 μm, because the surface area of the particles becomes large as a whole, the shell material becomes thin and the storage stability of the thermosetting resin composition decreases. On the other hand, if the mean particle diameter is greater than 20 μm, uniform curing of the resin becomes difficult, and particularly when applied to a prepreg, the curing agent cannot be sufficiently dispersed in a gap between reinforcing fibers and a prepreg having an excellent quality cannot be obtained.

Further, the weight ratio of the thermoplastic resin which is a shell material relative to the curing agent which is a core material is preferably in the range of 0.5 to 7, more preferably in the range of 0.7 to 5. If such a weight ratio is less than 0.5, the shell material becomes too thin, there occurs a case that it becomes difficult to form a capsule or a case that the storage stability of the thermosetting resin composition decreases. If the weight ratio is more than 7, the wall material becomes too thick, and at the time of heating, it takes too long time for the thermoplastic resin forming the shell material to dissolve sufficiently to the thermosetting resin, and the curing reaction cannot smoothly proceed.

The microcapsule-type curing agent according to the present invention can be produced as follows.

Firstly, the aforementioned curing agent and thermoplastic resin are dissolved in an organic solvent. Although the dissolution concentration of the curing agent and thermoplastic resin is not particularly restricted, usually it is preferred that they are dissolved at a content of 5 to 20 parts by weight relative to an organic solvent of 100 parts by weight, respectively. As the organic solvent, a hydrophobic organic solvent having a boiling point of not higher than 100° C. is preferred.

Next, an emulsion solution is prepared by stirring and mixing the above-described solution with water. Although the weight ratio of water relative to the solution is not particularly restricted, usually a weight ratio of 1:1 is appropriately employed. A dispersion stabilizer is preferably dissolved in the water in advance. As such a dispersion stabilizer, a water soluble polymer such as polyvinyl alcohol or hydroxymethylcellulose or interfacial active agent such as an anionic interfacial active agent, a nonionic interfacial active agent or a cationic interfacial active agent can be used. Further, a hydrophilic inorganic colloid material such as colloidal silica or alumina can be used together.

As a method for preparing an emulsion solution by stirring and mixing a hydrophobic organic solvent and water, a method for discontinuously adding water to the solution of the organic solvent while stirring can be preferably employed. In this method, an emulsion solution in which a water phase is dispersed in the organic solvent is formed by initial addition of water, and as water is further added, the solution is transformed into an emulsion solution in which an organic solvent phase is dispersed in water. By use of this method, an emulsion solution, wherein a solution dissolved with a curing agent and a thermoplastic resin is finely dispersed in water, can be prepared.

When the solvent is removed from the emulsion solution thus obtained, a particle-like water dispersion material, in which a curing agent is coated with a thermoplastic resin, can be formed. As a method for removing the solvent from the emulsion solution, a method for evaporating the solvent by gradually heating the emulsion solution up to a temperature close to the boiling point of the solvent while stirring, or a method for evaporating the solvent under reduced pressure, is preferred. Then, after cooling the water dispersion material of particles which are formed as capsules, a microcapsule-type curing agent formed as powder-like or particle-like material can be obtained by filtering and drying the water dispersion material. In the microcapsule-type curing agent thus obtained, the capsule shape is substantially spherical in most cases. When the microcapsule-type curing agent is mixed with a thermosetting resin, because the viscosity rise of the thermosetting resin composition is small, the mixing can be easily performed.

Next, the thermosetting resin composition according to the present invention will be explained.

The thermosetting resin composition according to the present invention contains the aforementioned microcapsule-type curing agent and a thermosetting resin as inevitable components. Further, the microcapsule-type curing agent may be used together with other curing agents. By using the microcapsule-type curing agent, a thermosetting resin composition good in storage stability at a room temperature can be obtained, and more concretely, even in a one-package type thermosetting resin composition, it can be prepared as a thermosetting resin composition which does not require preservation in a refrigerator and which can initiate its curing merely by heating it at a predetermined temperature.

As the thermosetting resin, a resin capable of being cured by the curing agent contained in the microcapsule-type curing agent is used. Particularly, from the viewpoint of good thermal resistance and mechanical properties, an epoxy resin, a cyanate ester resin, a maleimide resin and a resin produced by pre-reaction of a cyanate ester resin and a maleimide resin are preferably used.

As the epoxy resin, a compound having a plurality of glycidyl groups in a molecule is used. For example, bisphenol A type epoxy resins, bisphenol F type epoxy resins, bisphenol S type epoxy resins, biphenyl type epoxy resins, naphthalene type epoxy resins, novolak type epoxy resins, epoxy resins having a fluorene structure, epoxy resins prepared from reaction products of phenolic compound and dicyclopentadiene, glycidylether type epoxy resins such as diglycidylresorcinol, tetrakis(glycidyloxyphenyl)ethane or tris(glycidyloxyphenyl)methane, glycidylamine type epoxy resins such as tetraglycidyldiaminodiphenylmethane, triglycidylaminophenol, triglycidylaminocresol or tetraglycidylxylenediamine, and a mixture thereof can be raised. As the microcapsule-type curing agent used for an epoxy resin, a curing agent containing an aliphatic amine, a cycloaliphatic amine, an aromatic amine, a polyamide, urea compound, an imidazole compound, a guanidine compound, a hydrazide compound, an acid anhydride, a Lewis acid complex, a phenolic compound or a mercaptan compound is preferred. Further, a microcapsule-type curing agent containing an additional reaction product of a compound containing glycidyl groups and a compound selected from an aliphatic amine, a cycloaliphatic amine, an aromatic amine, a polyamide, an imidazole compound and a guanidine compound is also preferably used. Furthermore, the microcapsule-type curing agent can be used as a curing-accelerating agent together with other curing agents. For example, combination of (1) a microcapsule-type curing agent containing an imidazole compound or a microcapsule-type curing agent containing an additional reaction product of an imidazole compound and a compound containing glycidyl groups and (2) dicyandiamide which is not formed as a microcapsule can be effectively employed.

The maleimide resin is a compound having a plurality of maleimide groups in a molecule, and a compound such as methylenebis-p-phenylenedimaleimide can be used. For a maleimide resin, a microcapsule-type curing agent containing an aromatic amine, a phenolic compound or an imidazole compound is preferred.

The cyanate ester resin is a cyanate ester of a polyfunctional phenol such as bisphenol A, bisphenol F or novolak. For a cyanate ester resin, a microcapsule-type curing agent containing a Lewis acid complex is preferably used.

As the resin produced by pre-reaction of a cyanate ester resin and a maleimide resin, for example, reaction products of methylenebis-p-phenylenedimaleimide and a cyanate ester of bisphenol A can be raised. For such a resin, a microcapsule-type curing agent containing an aromatic amine, a phenolic compound, an imidazole compound or a Lewis acid complex is preferably used.

These thermosetting resins can be appropriately used together. For example, combination of an epoxy resin with pre-reaction products of a cyanate ester resin and a maleimide resin is preferred because the curing temperature can be lowered as compared with a case of not including the epoxy resin.

Further, a reactive diluent such as monoglycidylether, a thermoplastic resin such as polyethersulfone, polyetherimide or polyvinylformal, an elastomer such as acrylonitrile-butadiene copolymer and inorganic particles such as silica, alumina or silicate compound particles may be added to the thermosetting resin as needed.

The prepreg according to the present invention comprises the aforementioned thermosetting resin composition and reinforcing fibers. By using the thermosetting resin composition according to the present invention, a prepreg good in storage stability at a room temperature can be prepared. As the reinforcing fibers, glass fibers, carbon fibers, aramide fibers, boron fibers, alumina fibers, silicon carbide fibers, etc. can be used. Among these fibers, particularly carbon fibers are preferred. The formation of the reinforcing fibers is not particularly restricted. For example, various forms such as long fibers arranged unidirectionally, tow, woven fabric, mat, knitted fabric and braid can be employed. The prepreg can be produced by a known method. For example, a method for forming a resin film by applying a thermosetting resin composition onto a releasing paper using a coater such as a reverse roll coater, and pressing the resin films onto both surfaces of a sheet of reinforcing fibers while heating, thereby impregnating the resin into the reinforcing fibers can be employed.

In a case where the thermosetting resin composition according to the present invention is used as a matrix resin for a prepreg, preferably a thermosetting resin composition whose main constituent is an epoxy resin is used in order to achieve excellent mechanical properties such as elongation and elastic modulus of a cured product and to improve the adhesion between the resin and the reinforcing fibers. Further, it is preferred that various epoxy resins are compounded to the thermosetting resin composition in order to give appropriate tack and drape to prepregs as well as in order to give high thermal resistance and toughness to a cured product. Such a preferable composition of epoxy resin is, for example, a composition in which among 100 parts by weight of the whole of epoxy resins, a bisphenol type epoxy resin is compounded by an amount greater than 40 parts by weight and a phenol novolak type epoxy resin is compounded by an amount of not greater than 60 parts by weight. As the bisphenol type epoxy resin, for example, bisphenol A type epoxy resin and bisphenol F type epoxy resin can be used. As the bisphenol A type epoxy resins, resins which are commercially available such as "Epikote"® Ep825, Ep828, Ep1001 and Ep1004 (produced by Yuka Shell Epoxy Corporation), "Epotohto"® YD128 (produced by Tohto Kasei Corporation), "Epicron"® Epc840, Epc850, Epc855, Epc860, Epc1050 (produced by Dainippon Ink Kagaku Kogyo Corporation), "Sumi-epoxy"® ELA128 (produced by Sumitomo Kagaku Kogyo Corporation) and DER330 and DER331 (produced by Dow Chemical Japan Corporation) can be employed. As the bisphenol F type epoxy resins, resins which are commercially available such as "Epicron"® Epc830 (produced by Dainippon Ink Kagaku Kogyo Corporation) and "Epikote"® Ep807 (produced by Yuka Shell Epoxy Corporation) can be employed. In a cured product of the resin composition whose main constituent is a bisphenol type epoxy resin as described above, the toughness of the resin is high but the elastic modulus thereof is low. In consideration of these characteristics, in order to prevent deterioration of the tack and drape of a prepreg caused by increase of the resin viscosity as well as to prevent decrease of the elastic modulus of a cured product while preventing decrease of the toughness of the cured product, the content of a bisphenol type epoxy resin in the thermosetting resin composition is controlled preferably at a content of not less than 40 parts by weight, more preferably at a content of 60 to 70 parts by weight, relative to 100 parts by weight of the whole content of epoxy resin.

As the phenol novolak type epoxy resins, resins which are commercially available such as "Epikote"® Ep152 and Ep154 (produced by Yuka Shell Epoxy Corporation), DER438 (produced by Dow Chemical Japan Corporation) and "Araldite"® EPN1138 and EPN1139 (produced by Japan Ciba-Geigy Corporation) can be employed. Although a cured product of a resin composition whose main constituent is such a phenol novolak type epoxy resin has high thermal resistance and water resistance, the toughness thereof is low. In consideration of these characteristics, in order to maintain high thermal resistance and water resistance while to prevent decrease of the toughness of a cured product, at the same time, in order to prevent decrease of the elastic modulus of the cured product as well as to prevent deterioration of the tack and drape of a prepreg caused by increase of the resin viscosity, the content of a phenol novolak type epoxy resin in the thermosetting resin composition is controlled preferably at a content of not more than 60 parts by-weight, more preferably at a content of 30 to 40 parts by weight, relative to 100 parts by weight of the whole content of epoxy resin.

The fiber reinforced composite material according to the present invention comprises reinforcing fibers and a matrix resin, and the matrix resin comprises a cured material of the aforementioned thermosetting resin composition. As the reinforcing fibers, glass fibers, carbon fibers, aramide fibers, boron fibers, alumina fibers, silicon carbide fibers, etc. are used. Among these reinforcing fibers, carbon fibers are particularly preferred.

For the production of the fiber reinforced composite material, a known method can be employed. For example, a hand lay up method for applying a thermosetting resin composition to a woven fabric or a mat of reinforcing fibers, pressing the resin onto and impregnating the resin into the woven fabric or mat using pressing tools such as a roller and thereafter heating and curing the resin, a filament winding method for winding a bundle of reinforcing fibers impregnated with a thermosetting resin composition onto a mold called a mandrel and molding the resin by heating and curing, a pultrusion method for supplying reinforcing fibers to a heating die having a predetermined shape while impregnating a thermosetting resin composition thereinto and molding a product by giving a form and heating and curing by continuously drawing, a sheet molding compound method for supplying continuous reinforcing fibers or reinforcing fibers cut at a predetermined length and a thermosetting resin composition to a sheet molding machine, and pressing and impregnating the resin composition into the sheet of reinforcing fibers to form a sheet material, and a resin transfer molding method for placing a preform, which is made by giving a predetermined form to a woven fabric or mat of reinforcing fibers, in a mold, and injecting a thermosetting resin composition into the mold and curing it, can be employed. Further, in a case where the aforementioned prepreg is used, a known method, for example, a method for stacking the prepregs and heating and curing them to form a fiber reinforced composite material can be employed.

EXAMPLES AND COMPARATIVE EXAMPLES

Preferred examples will be hereinafter explained together with comparative examples. In the examples and comparative examples, all the described parts are parts by weight.

Example 1

A mixture of 30 parts of 2-methylimidazole and 90 parts of xylene were heated at 120 ° C. and stirred to make a solution. While continuing the stirring, 87 parts of phenylglycidylether was added dropwise to the solution for one hour, and further stirring was continued for 30 minutes. Then, most of xylene was removed under reduced pressure. Further, the residue was vacuum dried at 70° C. for 24 hours to prepare an addition product as a viscous liquid.

Fifty parts of the addition product thus prepared and 50 parts of polyetherimide "Ultem"® 1000 (softening point: 219 ° C., produced by General Electric Corporation) were dissolved in 400 parts of methylene chloride to obtain a solution. While stirring the solution at room temperature and at a stirring speed of 700 rpm, 600 parts of water dissolved with 30 parts of polyvinyl alcohol (saponification degree: 87 mol %, polymerization degree: 500) was divided into four parts, and the respective divided parts of the water were added to the solution at intervals of one minute to obtain an emulsion solution. Thereafter, the solution was gradually heated up to 50° C. while stirring the solution at a speed of 15 rpm, and methylene chloride was evaporated for two hours to obtain a water dispersion material of fine particles. This dispersion material was filtered after cooling, washed by water to obtain powder, and the powder was vacuum dried at a room temperature for 24 hours to obtain a microcapsule-type curing agent having a mean particle diameter of 7 μm.

Twenty parts of the microcapsule-type curing agent obtained was mixed with 100 parts of bisphenol A type epoxy resin "Epikote"® Ep828. This liquid-like mixture was left at 40° C. and the change of the glass transition temperature thereof was determined using a differential scanning calorimeter (produced by Mettler Corporation, type: DSC-TC10A, hereinafter, merely referred to as "DSC"). As a result, the glass transition temperature immediately after the mixing was −20° C., and the glass transition temperature after two months was −18° C., and thus, the glass transition temperature was extremely stable. Further, when the mixture having the same composition as described above was cured at 130° C. for two hours, a cured product having a glass transition temperature of 148° C. was obtained.

Furthermore, a sample prepared by applying the mixture with the above-described composition onto a glass plate was set in a microscope having a hot plate, and it was heated at a heating rate of 2° C./min. and the change of the mixture was observed. As a result, the shell material of the capsule particles began to dissolve in the epoxy resin at a temperature near 85° C. and it completely dissolved at 115° C.

COMPARATIVE EXAMPLE 1

Ten parts of the addition product which was obtained in Example 1 was mixed with 100 parts of "Epikote"® Ep828 to obtain an epoxy resin composition. When the composition was left at 40° C., it was hardened after one day. The glass transition temperature of the hardened resin composition was 52° C.

EXAMPLE 2

Polyethersulfone "Victrex"® 4100P (softening point: 220° C., produced by Imperial Chemical Industry Corporation), 50 parts, and 400 parts of a solvent in which methylene chloride and chloroform were mixed at the same amount, and 50 parts of diaminodiphenylmethane was added to and dissolved in the solution to prepare a solution. This solution was treated in a manner similar to that in Example 1, thereby obtaining a microcapsule-type curing agent having a mean particle diameter of 5 μm.

The obtained microcapsule-type curing agent, 20 parts, was mixed with 50 parts of Ep828. When this mixture was left at 40° C. and the change of the glass transition temperature was determined, the glass transition temperature immediately after the mixing was −19° C., and the glass transition temperature after two months was −16° C., and thus, the glass transition temperature was extremely stable. Further, when the mixture having the same composition as described above was cured at 150° C. for two hours, a cured product having a glass transition temperature of 161° C. was obtained.

COMPARATIVE EXAMPLE 2

Diaminodiphenylmethane, 10 parts, was mixed with 40 parts of Ep828, the mixture was left at 40° C. and the change of the glass transition temperature was determined. The glass transition temperature immediately after the mixing was −17° C., but the glass transition temperature after two days increased to 3° C.

EXAMPLE 3

1-benzyl-2-phenylimidazole, 50 parts, and 100 parts of polyetherimide "Ultem"® 1000 were dissolved in 100 parts of methylene chloride. While stirring this solution at room temperature and at a speed of 700 rpm, 500 parts of water dissolved with anionic interfacial active agent 25 parts of "Monogen"® Y-100 (sodium salt of higher alcohol sulfate, produced by Daiichi Kogyo Seiyaku Corporation) was divided into four parts and the respective divided parts of the water were added to the solution at intervals of one minute to obtain an emulsion solution. Thereafter, the solution was transferred into a rotary evaporator, and while stirring the solution at a rotational speed of 30 rpm, methylene chloride was removed for one hour under reduced pressure to obtain a water dispersion material of fine particles. This dispersion material was filtered and washed by water to obtain powder, and the powder was vacuum dried at a room temperature for 24 hours to obtain a microcapsule-type curing agent having a mean particle diameter of 1 μm.

The microcapsule-type curing agent obtained, 20 parts, was mixed with 100 parts of bisphenol A type epoxy resin "Epikote"® Ep828. This liquid-like mixture was left at 40° C. and the change of the glass transition temperature thereof was determined using DSC. As a result, the glass transition temperature immediately after the mixing was −19° C., and the glass transition temperature after two months was −17° C., and thus, the glass transition temperature was extremely stable. Further, when the mixture having the same composition as described above was cured at 130° C. for two hours, a cured product having a glass transition temperature of 152° C. was obtained.

EXAMPLE 4

Epoxy resin "Epikote"® Ep828, 100 parts, was mixed with 3.5 parts of dicyandiamide and 10 parts of the microcapsule-type curing agent obtained in Example 3 to obtain an epoxy resin composition. This composition was left at 40° C. and the change of the glass transition temperature thereof was determined. As a result, the glass transition temperature immediately after the mixing was −20° C., and the glass transition temperature after 20 days was −18° C., and thus, the glass transition temperature was stable. Further, the glass transition temperature of a cured product obtained by curing the composition at 130° C. for two hours was 151° C.

COMPARATIVE EXAMPLE 3

Epoxy resin "Epikote"® Ep828, 100 parts, was mixed with 3.5 parts of dicyandiamide and 4 parts of 3-(3,4-dichlorophenyl)-1,1-dimethyl urea to obtain an epoxy resin composition. This composition was left at 40° C. and the change of the glass transition temperature thereof was determined. As a result, the glass transition temperature immediately after the mixing was −20° C., but the glass transition temperature after 20 days increased up to −5° C. Further, the glass transition temperature of a cured product obtained by curing the composition at 130° C. for two hours was 140° C.

EXAMPLE 5

A-microcapsule-type curing agent having a mean particle diameter of 7 μm was obtained in a manner similar to that of Example 1.

Bisphenol A type epoxy resin "Epikote"® Ep828, 60 parts, 40 parts of phenol novolak type epoxy resin "Epikote"® Ep154 and 20 parts of the above-described curing agent were mixed to obtain an epoxy resin composition. This composition was cured at 130° C. for two hours. The glass transition temperature of the obtained cured product was 149° C.

The epoxy resin composition was heat treated at 40° C. and the change of the glass transition temperature thereof was determined. As a result, the glass transition temperature before the heat treatment was −9° C., and the glass transition temperature after two months was −7° C., and thus, the glass transition temperature was extremely stable.

Further, the above-described epoxy resin composition was applied onto a releasing paper using a film coater to prepare a resin film. The weight per unit area of the resin film was 63 g/m$^2$. Then, the resin film was set in a prepreg forming apparatus, and the resin was heated and pressed and impregnated into a carbon fiber plain weave fabric (CO7373Z, produced by Toray Industries, Inc., the weight per unit area of the fabric: 198 g/m$^2$) from both surfaces of the fabric to obtain a prepreg having a resin content of 40% by weight. This prepreg was excellent in tack and drape.

An FEP film was placed on a aluminum tool plate, and five above-described prepregs and an FEP film were stacked thereon. The whole of this material was wrapped with a nylon bag film, and thereafter, it was placed in an autoclave, and while the pressure in the bag is reduced, it was heated up to 130° C. at a heating rate of 1.5° C./min. under a pressure condition of 6 kgf/cm$^2$ and it was kept at the temperature for two hours. After cooling, the cured composite panel was taken out. The determined glass transition temperature thereof was 143° C.

EXAMPLE 6

A microcapsule-type curing agent having a mean particle diameter of 1 μm was obtained in a manner similar to that of Example 3.

Bisphenol A type epoxy resin "Epikote"® Ep828, 60 parts, 40 parts of phenol novolak type epoxy resin "Epikote"® Ep154 and 15 parts of the above-described curing agent were mixed to obtain an epoxy resin composition. This epoxy resin composition was cured at 130° C. for two hours. The glass transition temperature of the cured product was 154° C.

The epoxy resin composition was heat treated at 40° C. and the change of the glass transition temperature thereof was determined. As a result, the glass transition temperature before the heat treatment was −11° C., and the glass transition temperature after two months was −8° C., and thus, the glass transition temperature was extremely stable.

Further, the above-described epoxy resin composition was applied onto a releasing paper using a film coater to prepare a resin film. The weight per unit area of the resin film was 52 g/m$^2$. Then, the resin film was set in a prepreg forming apparatus, and the resin was heated and pressed and impregnated into carbon fibers which were arranged unidirectionally so as to form a sheet of carbon fibers of "Torayca"® T700S (produced by Toray Industries, Inc., the weight per unit area of the sheet: 190 g/m$^2$) from both surfaces of the sheet to obtain a prepreg having a resin content of 35% by weight. This prepreg was excellent in tack and drape.

The prepregs obtained were stacked in a manner similar to that of Example 5 and cured. The determined glass transition temperature of the obtained composite panel was 151° C.

EXAMPLE 7

A microcapsule-type curing agent having a mean particle diameter of 1 μm was obtained in a manner similar to that of Example 3.

Bisphenol A type epoxy resin "Epikote"® Ep828, 40 parts, 30 parts of "Epikote"® Ep1001, 30 parts of phenol novolak type epoxy resin "Epikote"® Ep154, 3 parts of dicyandiamide and 8 parts of the above-described curing agent were mixed to obtain an epoxy resin composition. This epoxy resin composition was cured at 130° C. for two hours. The glass transition temperature of the cured product was 147° C.

The epoxy resin composition was heat treated at 40° C. and the change of the glass transition temperature thereof was determined. As a result, the glass transition temperature before the heat treatment was −4° C., and the glass transition temperature after 20 days was −2° C., and thus, the glass transition temperature was extremely stable.

Further, the above-described epoxy resin composition was applied onto a releasing paper using a film coater to prepare a resin film. The weight per unit area of the resin film was 52 g/m$^2$. Then, the resin film was set in a prepreg forming apparatus, and the resin was heated and pressed and impregnated into carbon fibers which were arranged unidirectionally so as to form a sheet of carbon fibers of "Torayca"® T700S (produced by Toray Industries, Inc., the weight per unit area of the sheet: 190 g/m$^2$) from both surfaces of the sheet to obtain a prepreg having a resin content of 35% by weight. This prepreg was excellent in tack and drape.

The prepregs obtained were stacked in a manner similar to that of Example 5 and cured. The determined glass transition temperature of the obtained composite panel was 146° C.

COMPARATIVE EXAMPLE 4

The addition product, which was obtained in Example 3, 10 parts, was not formed=as Capsule and it was mixed with 60 parts of "Epikote"® Ep28 and 40 parts of "Epikote"® Ep154 to obtain an epoxy resin composition. When the composition was heat treated at 40° C., the glass transition temperature before the heat treatment was −11° C., but the glass transition temperature after one day increased up to 35° C.

COMPARATIVE EXAMPLE 5

Bisphenol A type epoxy resin "Epikote"® Ep828, 40 parts, 30 parts of "Epikote"® Ep1001, 30 parts of phenol novolak type epoxy resin "Epikote"® Ep154, 3 parts of dicyandiamide and 4 parts of 3-(3,4-dichlorophenyl)-1,1-dimethyl urea to obtain an epoxy resin composition. This epoxy resin composition was cured at 130° C. for two hours and the variation of the glass transition temperature was determined. As a result, the glass transition temperature before the heat treatment was −5° C., but the glass transition temperature after 20 days increased up to 13° C. and its tack almost disappeared.

COMPARATIVE EXAMPLE 6

The addition product of 2-methylimidazole and phenylglycidylether, which was prepared in a manner of Example 1, 50 parts, was dissolved in 400 parts of methylene chloride. The solution of the addition product was dropped for 30 minutes into 600 parts of water dissolved with 30 parts of polyvinyl alcohol while stirring it at a room temperature and at a stirring speed of 500 rpm to obtain an emulsion solution. Thereafter, the solution was treated in a manner similar to that of Example 1 to obtain a microcapsule-type curing agent having a mean particle diameter of 40 μm. An epoxy resin composition, a resin film and a prepreg were made in the same manner as that of Example 5 except for using this microcapsule-type curing agent as its curing agent. In the resin film obtained, longitudinal wrinkles originating from large particles of the curing agent were observed. In the prepreg obtained, large particles of the curing agent remained on the surface, and the curing agent was not uniformly impregnated in the inside of the carbon fiber woven fabric. Although the prepreg was molded by an autoclave, the glass transition temperature of a cured product obtained was 105° C.

As is evident also from the above-described Examples and Comparative Examples, the microcapsule-type curing agent according to the present invention is excellent in storage stability at a room temperature even in a state mixed with a thermosetting resin. Since the shell material is a thermoplastic resin dissolvable to a thermosetting resin by heating, a curing agent or a curing-accelerating agent present in a capsule can quickly disperse in an epoxy resin and react with the resin. Therefore, local non-uniformity of curing degree does not occur, and if the thermal resistance of the thermoplastic resin is increased, a thermosetting resin composition having a high thermal resistance can be obtained.

Since the thermosetting resin composition according to the present invention is excellent in storage stability at a room temperature as compared with conventional thermosetting resin compositions, it is not necessary to be preserved in a refrigerator and it is advantageous economically. Additionally, because a microcapsule-type curing agent which has a small particle diameter are used and the shell material of which can easily dissolve to a thermosetting resin, a cured product having excellent mechanical properties can be obtained.

The prepreg according to the present invention has the same advantages as those of the above-described thermosetting resin composition, and besides, since the microcapsule-type curing agent is sufficiently impregnated in a gap between reinforcing fibers, its curing condition can be maintained to be sufficiently uniform, and it can provide a fiber reinforced composite material having a high thermal resistance and excellent mechanical properties.

The fiber reinforced composite material according to the present invention can reflect the advantages of the above-described thermosetting resin composition, and it has a uniformly cured condition and has a high thermal resistance and excellent mechanical properties.

Although preferred embodiments and examples of the present invention have been described herein in detail, it will be appreciated by those skilled in the art that various modifications and alterations can be made to these embodiments and examples without materially departing from the novel teachings and advantages of this invention. Accordingly, it is to be understood that all such modifications and alterations are included within the scope of the invention as defined by the following claims.

What is claimed is:

1. A method for producing a microcapsule curing agent comprising the steps of:

dissolving i) a water-insoluble curing agent for a thermosetting resin and ii) a water-insoluble thermoplastic resin in an organic solvent and forming an organic solution;

forming an emulsion solution by initially adding water to the organic solution and, thereafter, further adding water to the organic solution and transforming the organic solution into an emulsion solution in which an organic solvent phase is dispersed in said water; and removing said organic solvent from the emulsified solution.

2. The method for producing a microcapsule curing agent according to claim 1, wherein said organic solvent is a hydrophobic organic solvent having a boiling point of not higher than 100° C.

3. The method for producing a microcapsule curing agent according to claim 1, wherein said water-insoluble thermoplastic resin has a softening point higher than 200° C.

4. The method for producing a microcapsule curing agent according to claim 1, wherein said organic solvent is removed by evaporation by heating.

5. The method for producing a microcapsule curing agent according to claim 1, wherein said organic solvent is removed by evaporation under reduced pressure.

6. The method for producing a microcapsule curing agent according to claim 1 wherein said solution is stirred during addition of said water to said organic solution.

7. A method for producing a microcapsule curing agent comprising the steps of:

dissolving i) a water-insoluble curing agent for a thermosetting resin and ii) a water-insoluble thermoplastic resin in an organic solvent and forming an organic solution;

forming an emulsion solution by initially adding water to the organic solution and, thereafter, further adding water to the organic solution and transforming the organic solution into an emulsion solution in which an organic solvent phase is dispersed in the water; and forming particles of said microcapsule curing agent by removing the solvent from the emulsion solution.

* * * * *

UNITED STATES PATENT AND TRADEMARK OFFICE
CERTIFICATE OF CORRECTION

PATENT NO.   : 5,589,523
DATED        : December 31, 1996
INVENTOR(S)  : Ryuji Sawaoka et al It is certified that error appears in the above-indentified patent and that said Letters Patent is hereby corrected as shown below:

Column 1, line 19, delete "a", first occurrence.
Column 1, line 23, insert --a-- before "fiber".
Column 4, line 18, please change "into" to --in--;

line 34, please change "aurea" to --a urea--.

Column 11, line 34, please change "3°C." to --30°C.--.

Column 14, line 9, delete "=" and change "Capsule" to --capsule--; and
line 10, please change "Ep28" to --Ep828--.

Signed and Sealed this

Twenty-seventh Day of May, 1997

*Attest:*

BRUCE LEHMAN

*Attesting Officer*       *Commissioner of Patents and Trademarks*